US012087260B1

(12) United States Patent
Kinter

(10) Patent No.: US 12,087,260 B1
(45) Date of Patent: Sep. 10, 2024

(54) SYSTEM AND METHOD FOR CREATING DYNAMIC, CHORD BASED, MIDI SCALE AND PATTERN GENERATOR EFFECTS THAT FIT OVER INCOMING CHORDS FROM EXTERNAL SOURCES

(71) Applicant: Zachary Charles Kinter, Rancho Cordova, CA (US)

(72) Inventor: Zachary Charles Kinter, Rancho Cordova, CA (US)

( * ) Notice: Subject to any disclaimer, the term of this patent is extended or adjusted under 35 U.S.C. 154(b) by 534 days.

(21) Appl. No.: 17/406,913

(22) Filed: Aug. 19, 2021

Related U.S. Application Data

(60) Provisional application No. 63/067,470, filed on Aug. 19, 2020.

(51) Int. Cl.

| | |
|---|---|
| ***G10H 1/38*** | (2006.01) |
| ***G10H 1/00*** | (2006.01) |
| ***G10H 1/44*** | (2006.01) |

(52) U.S. Cl.
CPC ........... *G10H 1/383* (2013.01); *G10H 1/0066* (2013.01); *G10H 1/44* (2013.01); *G10H 2210/335* (2013.01); *G10H 2210/346* (2013.01)

(58) Field of Classification Search
CPC ........ G10H 1/383; G10H 1/0066; G10H 1/44; G10H 2210/335; G10H 2210/346
See application file for complete search history.

(56) References Cited

U.S. PATENT DOCUMENTS

| | | | | |
|---|---|---|---|---|
| 10,262,643 | B1 * | 4/2019 | Kinter | G10H 5/06 |
| 2008/0072744 | A1 * | 3/2008 | Ito | G10H 1/28 84/638 |
| 2013/0305906 | A1 * | 11/2013 | Kinter | G10H 1/386 84/613 |
| 2015/0013532 | A1 * | 1/2015 | Adam | G09B 15/023 84/638 |

* cited by examiner

*Primary Examiner* — Jianchun Qin
(74) *Attorney, Agent, or Firm* — Plager Schack LLP; Mark H. Plager; Stephen Hallberg

(57) ABSTRACT

A dynamic, chord based, MIDI scale and pattern generator effects creation system and method is disclosed. This software eliminates the need for a "specific" chord information device and allows for any audio or MIDI input to influence MIDI effects for creating melodies, basslines and arpeggios that fit over specific chords.

20 Claims, 11 Drawing Sheets

SYSTEM AND METHOD FOR CREATING DYNAMIC, CHORD BASED, MIDI SCALE AND PATTERN GENERATOR EFFECTS THAT FIT OVER INCOMING CHORDS FROM EXTERNAL SOURCES

CLAIM OF BENEFIT TO PRIOR APPLICATION

This application claims benefit to U.S. Provisional Patent Application No. 63/067,470, entitled "Dynamic, Chord Based, MIDI Scale and Arp Effect," filed Aug. 19, 2020. The U.S. Provisional Patent Application No. 63/067,470 is incorporated herein by reference.

BACKGROUND

Embodiments of the invention described in this specification relate generally to music creation, and more particularly, to a system and method for creating dynamic, chord based, MIDI scale and pattern generator effects that fit over incoming chords from external sources.

In the current pro audio industry there are a multitude of chord-based software plugins and MIDI files for electronic music producers to choose from. However, there are no technologies that receive MIDI or audio chord information from external sources and provide MIDI effects for enhancing one's ability to play appropriate melodies, basslines, or arpeggios over the incoming chord progression. Instead, current MIDI effects for creating melodies, basslines, and arpeggios are limited to the chord information provided within their own "specific" program or partner program(s) made by the same developer.

Therefore, what is needed is a way to receive MIDI or audio chord information from any external sources and provide MIDI effects for enhancing one's ability to play appropriate pattern generator effects, such as melodies, basslines, and arpeggios, over the incoming chord progression, thereby eliminating the need for a "specific" chord information device and allows for any audio or MIDI input to influence MIDI effects for creating the pattern generator effects (e.g., melodies, basslines and arpeggios) that fit over specific chords.

BRIEF DESCRIPTION

A novel dynamic, chord based, MIDI scale and pattern generator effects creation system and a novel method for creating dynamic, chord based, MIDI scale and pattern generator effects that fit over incoming chords from external sources are disclosed. In some embodiments, the dynamic, chord based, MIDI scale and pattern generator effects creation system and the method for creating dynamic, chord based, MIDI scale and pattern generator effects that fit over incoming chords from external sources (hereinafter also referred to as the "dynamic, chord based, MIDI scale and pattern generator effects creation method" or the "dynamic, chord based, MIDI scale and pattern generator effects creation software method") eliminates the need for a specific chord information device and allows for any audio or MIDI input to influence MIDI effects for creating pattern generator effects, such as melodies, basslines, and arpeggios, that fit over specific chords.

In some embodiments, the dynamic, chord based, MIDI scale and pattern generator effects creation method starts by (i) analyzing incoming MIDI or audio input, then (ii) determining which chords are playing, and thereafter (iii) applying multiple MIDI effects for easily playing pattern generator effects, such as melodies, basslines, and arpeggios, that fit over the incoming chords.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
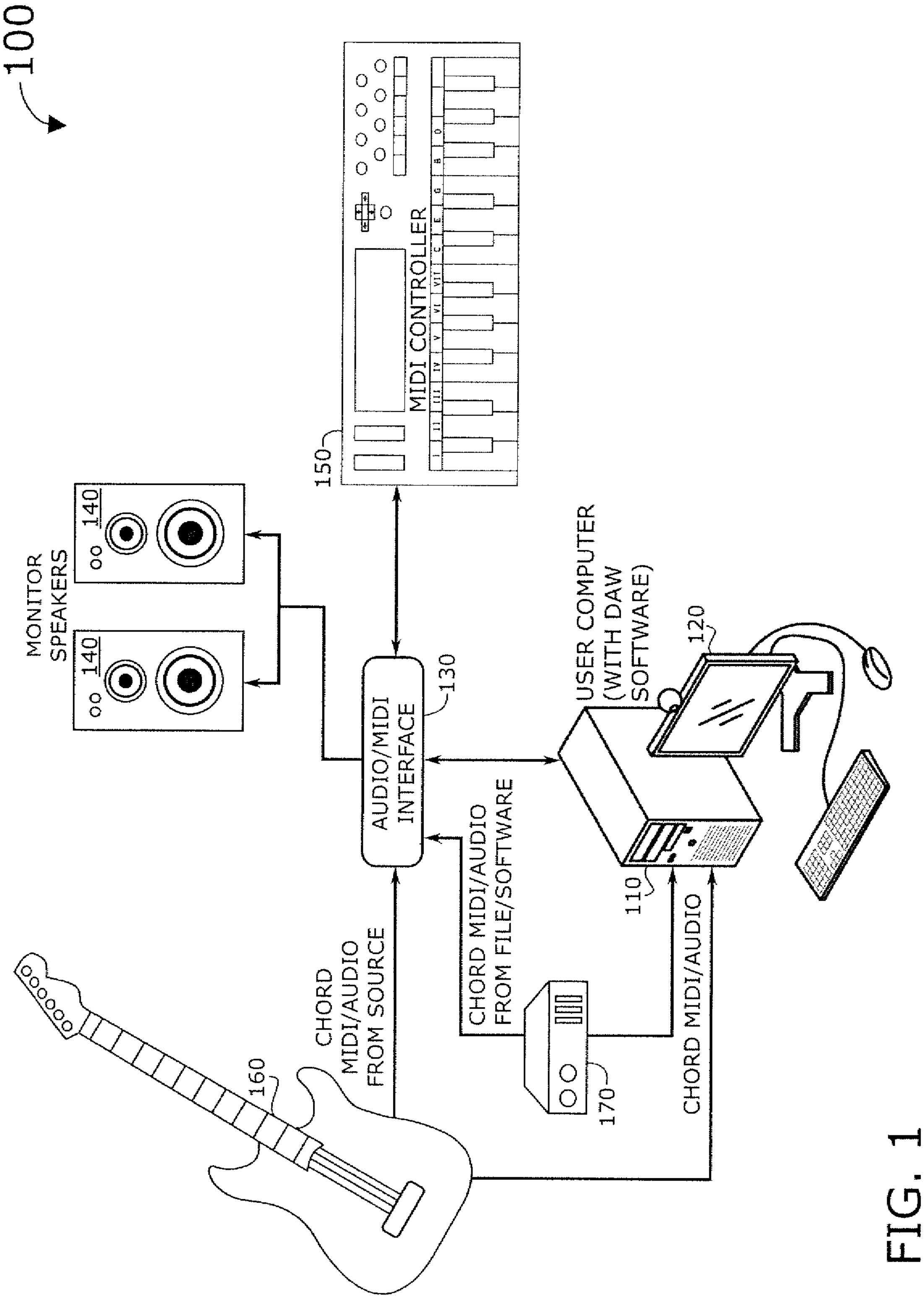
FIG. 1 conceptually illustrates a system for creating dynamic, chord based, MIDI scale and pattern generator effects that fit over incoming chords from external sources in some embodiments.

In the following detailed description of the invention, numerous details, examples, and embodiments of the invention are described. Also, in the present specification, the term "pattern generator effects" means, individually and collectively, melodic patterns, bassline patterns, and arpeggio patterns. However, it will be clear and apparent to one skilled in the art that the invention is not limited to the embodiments set forth and that the invention can be adapted for any of several applications.

Some embodiments provide a dynamic, chord based, MIDI scale and pattern generator effects creation system and a method for creating dynamic, chord based, MIDI scale and pattern generator effects that fit over incoming chords from external sources (also referred to as the "dynamic, chord based, MIDI scale and pattern generator effects creation method" or the "dynamic, chord based, MIDI scale and pattern generator effects creation software method", or in combination as the "dynamic, chord based, MIDI scale and pattern generator effects creation system and method"). In some embodiments, the dynamic, chord based, MIDI scale and pattern generator effects creation system and method eliminates the need for a specific chord information device and allows for any audio or MIDI input to influence MIDI effects for creating pattern generator effects, such as melodies, basslines, and arpeggios, that fit over specific chords.

In some embodiments, the dynamic, chord based, MIDI scale and pattern generator effects creation method starts by (i) analyzing incoming MIDI or audio input, then (ii) determining which chords are playing, and thereafter (iii) applying multiple MIDI effects for easily playing pattern generator effects for melodies, basslines, and arpeggios that fit over the incoming chords.

As stated above, in the current pro audio industry there are a multitude of chord-based software plugins and MIDI files for electronic music producers to choose from. Yet, there are no technologies that receive MIDI or audio chord information from external sources and provide MIDI effects for enhancing one's ability to play appropriate melodies, basslines, or arpeggios over the incoming chord progression. Embodiments of the dynamic, chord based, MIDI scale and pattern generator effects creation system and method described in this specification solve such problems by analyzing incoming MIDI or audio input, determining which chords are playing, and applying multiple MIDI effects for easily playing pattern generator effects, such as melodies, basslines, and arpeggios, that fit over the incoming chords.

Embodiments of the dynamic, chord based, MIDI scale and pattern generator effects creation system and method described in this specification differ from and improve upon currently existing options by allowing chord information to be delivered from any peripheral source to influence internal MIDI effects for easily playing pattern generator effects, such as melodies, basslines, and arpeggios, freeing it up to be used in any type of pro audio studio setup imaginable.

In addition, most electronic music producers desire flexibility within their studio setups, and being forced to use a specific "Chord" device when using MIDI effects for melodies, basslines, and arpeggios is very confining. By contrast, the dynamic, chord based, MIDI scale and pattern generator effects creation system and method described in this specification eliminates the need for a "specific" chord information device and allows for any audio or MIDI input to influence MIDI effects for creating pattern generator effects, such as melodies, basslines, and arpeggios, that fit over the chords.

The dynamic, chord based, MIDI scale and pattern generator effects creation system and method of the present disclosure may be comprised of the following elements. This list of possible constituent elements is intended to be exemplary only and it is not intended that this list be used to limit the dynamic, chord based, MIDI scale and pattern generator effects creation system and method of the present application to just these elements. Persons having ordinary skill in the art relevant to the present disclosure may understand there to be equivalent elements that may be substituted within the present disclosure without changing the essential function or operation of the dynamic, chord based, MIDI scale and pattern generator effects creation system and method.

1. Software that implements the dynamic, chord based, MIDI scale and pattern generator effects creation method to fit over incoming chords from external sources (also referred to as the "dynamic, chord based, MIDI scale and pattern generator effects creation software method").
2. Computing device on which the software runs.
3. Display screen for visual output of data and which allows the user to visibly interact with the software.
4. Audio Interface.
5. Monitor Speakers.
6. Digital Audio Workstation (DAW) which includes host music production software (DAW software); alternatively, a hardware device (e.g., keyboard, sampler, synthesizer, etc.) that does not require a computer.
7. MIDI Controller.
8. Destination sound producing instrument software.
9. Chord information source (MIDI or audio from files or software)

The various elements of the dynamic, chord based, MIDI scale and pattern generator effects creation system and method of the present disclosure may be related in the following exemplary fashion. It is not intended to limit the scope or nature of the relationships between the various elements and the following examples are presented as illustrative examples only. The computing device (2), the display screen (3), and peripheral devices used in connection the computing device (2), such as a cursor pointing device (e.g., a "mouse"), a trackpad, etc., or a touchscreen physical interface of the display screen (3), along with any other peripherals needed for perceptible audio output (i.e., the audio interface (4), the monitor speakers (5), MIDI controller (7)) are connected. The dynamic, chord based, MIDI scale and pattern generator effects creation software method (1), the DAW software (6), and the destination sound producing software (8) are all installed on the computing device (2). Both the dynamic, chord based, MIDI scale and pattern generator effects creation software method (1) and the destination sound producing instrument software (8) are open within the host DAW software (6). The chord information source (9) sends MIDI or audio into the dynamic, chord based, MIDI scale and pattern generator effects creation software method (1), which applies MIDI effects for the user to play on their MIDI controller (7). MIDI is then output from the dynamic, chord based, MIDI scale and pattern generator effects creation software method (1) to the destination sound producing instrument software (8). The dynamic, chord based, MIDI scale and pattern generator effects creation software method could also be integrated natively within a host DAW software program, such as DAW (6). However, instead of the DAW (6), this process can also happen within a hardware device such as a keyboard, a sampler, or a synthesizer, where a computer and computer peripherals are not necessary. Similarly, the dynamic, chord based, MIDI scale and pattern generator effects creation software method could be integrated into another sound producing instrument software program. For example, the dynamic, chord based, MIDI scale and pattern generator effects creation software method could be compiled into a software plug-in that another sound producing instrument software program is configured to accept for integration.

By way of example, FIG. 1 conceptually illustrates a system for creating dynamic, chord based, MIDI scale and pattern generator effects that fit over incoming chords from external sources in some embodiments. As shown in this figure, the system for creating dynamic, chord based, MIDI scale and pattern generator effects that fit over incoming chords from external sources (in this example referred to as "a dynamic, chord based, MIDI scale and pattern generator effects creation system 100") comprises a plurality of audio hardware, computing hardware, controller hardware and interfaces, and software components. In particular, the dynamic, chord based, MIDI scale and pattern generator effects creation system 100 includes a computing device (with digital audio workstation ("DAW") software) 110, a display monitor 120 that is communicably connected to the DAW computing device 110, an audio/MIDI interface 130, a pair of monitor speakers 140, a MIDI controller 150, a first instrument-based chord information source 160 that is configured to output MIDI/audio chord information to the computing device (with DAW software) 110 and/or the audio/MIDI interface 130 for redirection to the computing device (with DAW software) 110, and a second file or software-based chord information source 170 that in configured to output MIDI/audio chord information to the computing device (with DAW software) 110 and/or the audio/MIDI interface 130 for redirection to the computing device (with DAW software) 110. In this example, the software that implements the dynamic, chord based, MIDI scale and pattern generator effects creation method to fit over incoming chords from external sources is installed onto the computing device (with DAW software) 110 and, as such, coincides with the DAW software or is integrated into the DAW software or other music creation software as a plug-in module or other manner. In some embodiments, the computing device 110 does not have DAW software installed, but accesses a DAW software application service via the Internet. Similarly, in some embodiments, the dynamic, chord based, MIDI scale and pattern generator effects creation software method is deployed as a cloud service, accessible (over the Internet) to a user of the computing device 110 by a network connection to a cloud application service running on one or more cloud servers that host the dynamic, chord based, MIDI scale and pattern generator effects creation software method. In still other embodiments, the computing device 110 does not have DAW software installed, but is an audio electronic device in and of itself, such as a keyboard, a sampler, or a synthesizer, where the computing device itself and computer peripherals are not necessary—in that case, the computing device 110 would likely be deployed as an embedded device within the audio electronic device.

Although the dynamic, chord based, MIDI scale and pattern generator effects creation system 100 shown in this figure demonstrates two different chord information sources, namely, the first instrument-based chord information source 160 and the second file or software-based chord information source 170, the dynamic, chord based, MIDI scale and pattern generator effects creation system 100 could be arranged to receive chord information from other sources. For instance, the chord audio/MIDI input could be in the form of a file that is added to the software that implements the dynamic, chord based, MIDI scale and pattern generator effects creation method. Furthermore, a distinctive advantage provided by the dynamic, chord based, MIDI scale and pattern generator effects creation system 100 is that no matter what audio/MIDI chord information source is used, none of the chord information sources need to be known in advance by any of the other components for the dynamic, chord based, MIDI scale and pattern generator effects creation system 100 to effectively generate dynamic, chord based, MIDI scale and pattern generator effects that fit over those incoming chords. Whatever the source of the chord information, the computing device 110 is able to receive the chord audio/MIDI information for processing by the dynamic, chord based, MIDI scale and pattern generator effects creation software method, and when completed, outputs the resulting data to the MIDI controller 150 by way of the audio/MIDI interface 130. This general manner of processing is true whether the dynamic, chord based, MIDI scale and pattern generator effects creation software method is installed locally on the computing device 110 or accessed remotely by the computing device 110 (e.g., by connecting to a cloud application service that provides the dynamic, chord based, MIDI scale and pattern generator effects creation software method as a web app or a mobile app that runs on a tablet computing device or a smartphone, etc.).

The dynamic, chord based, MIDI scale and pattern generator effects creation system and method of the present disclosure generally works by way of the software that implements the dynamic, chord based, MIDI scale and pattern generator effects creation method. Specifically, the dynamic, chord based, MIDI scale and pattern generator effects creation software method remaps standard MIDI through various MIDI effects, based upon chord information that is delivered through an external audio or "passive" MIDI input. Passive MIDI input refers to MIDI that is input into the background and provides chord information, while not being used for active MIDI selections in the dynamic, chord based, MIDI scale and pattern generator effects creation software method. The remapping process performed by the dynamic, chord based, MIDI scale and pattern generator effects creation software method involves dividing native MIDI tone locations into two categories, namely, an "individual tones" category and a "pattern generator effects" category which includes both an arpeggio pattern component and a melodic pattern component (and may further include a bassline pattern component and other pattern generated components). Both the arpeggio pattern component and melodic pattern component of pattern generator effects category refer to patterns of individual notes being played at different times. In particular, an arpeggio pattern will include only chord tones while a melodic pattern will include some tones that are not in the chord. The melodic pattern will establish the chord root as the lowest note in the pattern generator effects and will emphasize other chord tones. One example of this remapping process would place pattern generator effects on the native MIDI tone locations that correspond to black piano keys, while placing individual tones (which include chord and scale tones derived from inputted chord information) on the native MIDI tone locations that correspond to white piano keys. However, the remapping process could be configured to place pattern generator effects one the native MIDI tone locations that correspond to any set of specific piano keys, while placing individual tones on the native MIDI tone locations that correspond to other specific piano keys. Furthermore, the dynamic, chord based, MIDI scale and pattern generator effects creation software method could also function in a manner where all native MIDI tone locations function in either the "individual tones" category or the "pattern generator effects" category.

For native MIDI tone locations that remap "individual tones", multiple MIDI effect processes are applied by the dynamic, chord based, MIDI scale and pattern generator effects creation software method once chord information is received from an external source (passive MIDI input or external audio). First, the dynamic, chord based, MIDI scale and pattern generator effects creation software method rounds all tones to scale tones that are defined by the external chord information. Second, with the exception of an absolute scale mapping, a root note position is defined on one of the native MIDI tone locations. Third, with each chord change that is defined by the external chord information source, the dynamic, chord based, MIDI scale and pattern generator effects creation software method transposes scale tones in a manner that places the root note of the chord onto the root note position as defined in the second step. However, this third MIDI effect process does not apply for relative scale or absolute scale mappings. Also for the third step, the dynamic, chord based, MIDI scale and pattern generator effects creation software method can align scale tones in a plurality of different ways comprising at least the following three ways in which the dynamic, chord based, MIDI scale and pattern generator effects creation software method performs mapping of the scale tones: Dynamic Scale, Chord Tones or Chord Tones Only. The Dynamic Scale mapping aligns scale tones in their standard order (e.g., 1-2-3-4-5-6-7). The Chord Tones mapping aligns scale tones in an order that skips every other scale tone (e.g., 1-3-5-7-9(2)-11(4)-13(6)). The Chord Tones Only mapping only includes the exact tones in the chord (e.g., 1-3-5-1-3-5-1 for a basic triad chord, 1-3-5-7-1-3-5 for a 7th, 1-3-5-7-9(2)-1-3 for a 9th, etc.). Each of the previous examples relates to seven toned scales, but the concept could be applied to scales of any number of tones.

For native MIDI tone locations that apply "pattern generator effects", unique arpeggios, basslines, or melodic patterns that transpose to each chord (focusing on chord tones) can be assigned, by the dynamic, chord based, MIDI scale and pattern generator effects creation software method, to each native MIDI tone location. These pattern generator effects will reflect the most recent chord information provided by an external source. Each pattern generator effect will have a variety of parameters which can be programmed independently from the other pattern generator effects. Without limitation, the parameters could include: direction, octaves, gate, number of tones, chord type, rate, inversions, voicings, rhythm, etc.

To make the dynamic, chord based, MIDI scale and pattern generator effects creation system and method of the present disclosure, a person may write the software that implements the method for creating dynamic, chord based, MIDI scale and pattern generator effects that fit over incoming chords from external sources in a way that is configured to complete the tasks described above and provide the user with the ability to receive and use the chord information from any chord MIDI or audio input source. However, adding a sampler or synthesizer within the software would eliminate one step of routing when using the technology because the chord information would be selectively provided by user or programmed selections of the sampler or synthesizer. Similarly, the dynamic, chord based, MIDI scale and pattern generator effects creation software method could be integrated into a sampler or a synthesizer that is configured to accept such integration. Placing the technology within a keyboard instrument or hardware sampler/synthesizer would also circumvent certain aspects of the setup of the dynamic, chord based, MIDI scale and pattern generator effects creation software method.

While MIDI is the current industry standard for controlling software samplers and synthesizers, the dynamic, chord based, MIDI scale and pattern generator effects creation software method described in this specification can be applied to any other western tone mapping technology. In lieu of audio or MIDI chord information input, any other form of chord information input could also be substituted in the technology. Beyond the specified role as a plugin, the dynamic, chord based, MIDI scale and pattern generator effects creation software method could also be natively placed within the host DAW software, a keyboard instrument, a hardware sampler, or any other type of workstation where digital music production happens.

To use the dynamic, chord based, MIDI scale and pattern generator effects creation system and method of the present disclosure, a user would open a project file within a host DAW software program, and then load up a software instrument plugin instance of dynamic, chord based, MIDI scale and pattern generator effects creation software method. They would then route the MIDI output from the technology to another instrument (or host the other instrument within the dynamic, chord based, MIDI scale and pattern generator effects creation software method). They would then establish an audio or passive MIDI input for the dynamic, chord based, MIDI scale and pattern generator effects creation software method, which provides the incoming chord information. This chord information would trigger the dynamic, chord based, MIDI scale and pattern generator effects creation software method to remap the MIDI from external sources with each chord change. After setting this up, users would play MIDI from their controller (keyboard instrument, computer keyboard, pad controller, etc.) with the MIDI effects being applied to make it easier to play basslines, melodies and arpeggios that work well with each chord. Alternatively, the dynamic, chord based, MIDI scale and pattern generator effects creation software method could be contained in or integrated within the host DAW software, a keyboard instrument, a hardware sampler, or any other type of workstation where digital music production happens instead of functioning as a plugin within a host DAW.

Figure 2:
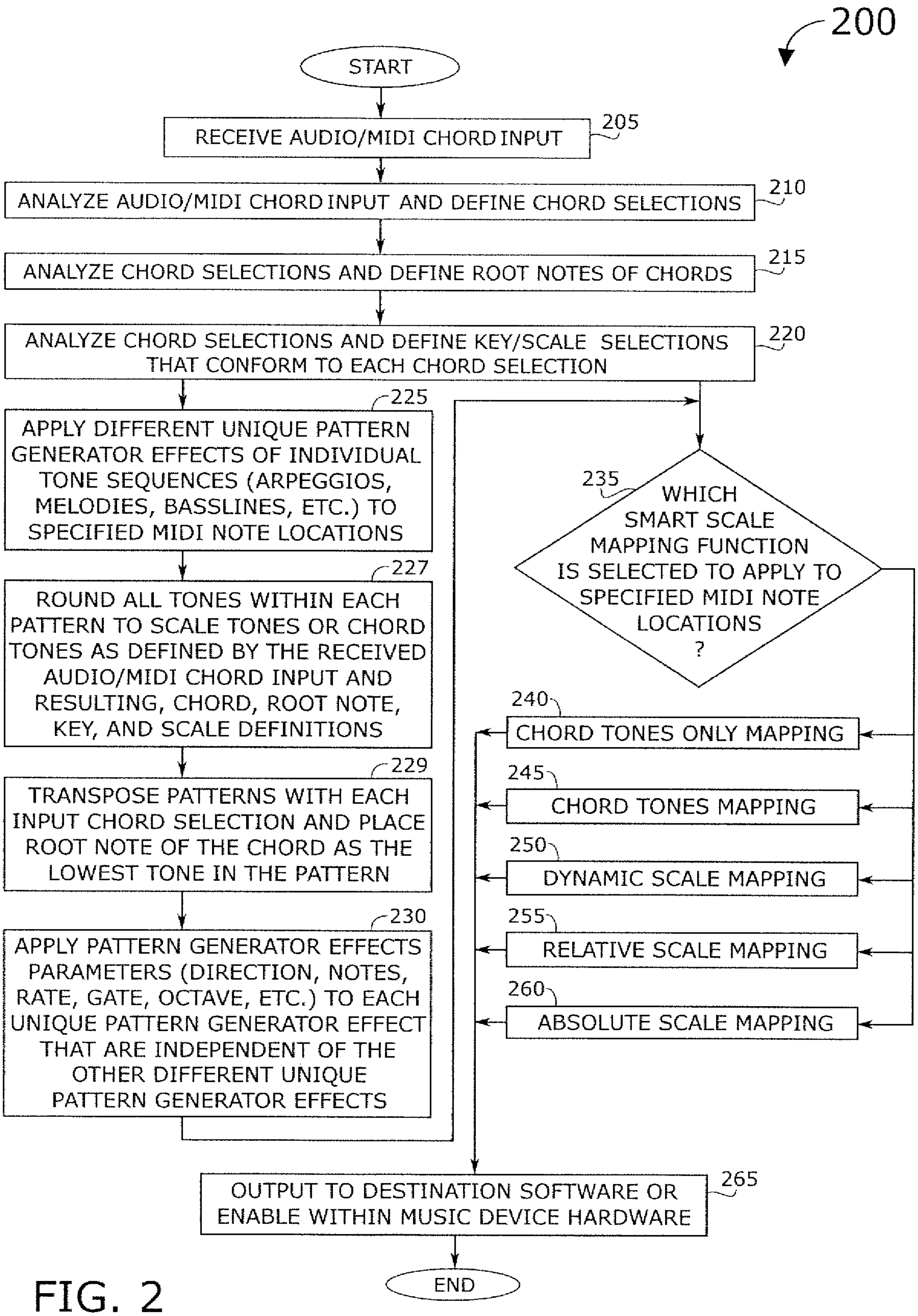
FIG. 2 conceptually illustrates a method for creating dynamic, chord based, MIDI scale and pattern generator effects that fit over incoming chords from external sources in some embodiments.

By way of example, FIG. 2 conceptually illustrates a method for creating dynamic, chord based, MIDI scale and pattern generator effects that fit over incoming chords from external sources ("dynamic, chord based, MIDI scale and pattern generator effects creation method 200"). Conceptually, the dynamic, chord based, MIDI scale and pattern generator effects creation method 200 is a software-implemented method that remaps standard MIDI through various MIDI effects, based upon chord information that is delivered through an external audio or passive MIDI input (that is, MIDI that is input into the background and provides chord information). Additionally, the chord input could be delivered in the form of one or more files that are added to the software that implements the dynamic, chord based, MIDI scale and pattern generator effects creation method. In some embodiments, the remapping of standard MIDI through chord-based MIDI effects by the dynamic, chord based, MIDI scale and pattern generator effects creation method 200 involves dividing native MIDI tone locations to specify MIDI note locations for individual tones and pattern generator effects. For example, the remapping could involve placement of pattern generator effects on the native MIDI tone locations that correspond to black piano keys and, by contrast, placement of individual tones (inclusive of both chord and scale tones derived from the incoming chord information) on the native MIDI tone locations that correspond to white piano keys. While the remapping process performed by the dynamic, chord based, MIDI scale and pattern generator effects creation method 200 starts with a clear division between individual tones and pattern generator effects, the distinction between black and white piano keys is an arbitrary distinction (an intended to provide a clear example of the division) since the division of the native MIDI tone locations to specified MIDI note locations for individual tones and pattern generator effects can be customized, tailored, and/or programmatically configured according to the needs of any user or application.

As shown in this figure, the dynamic, chord based, MIDI scale and pattern generator effects creation method 200 starts by receiving (at 205) incoming chord information from audio or passive MIDI input ("audio/MIDI chord input"). After receiving the audio/MIDI chord input, the dynamic, chord based, MIDI scale and pattern generator effects creation method 200 analyzes the audio/MIDI chord input and defines chord selections (at 210). With the chord selections defined, the dynamic, chord based, MIDI scale and pattern generator effects creation method 200 analyzes the chord selections and defines root notes of the chords (at 215). Next, the dynamic, chord based, MIDI scale and pattern generator effects creation method 200 analyzes the chord selections and defines key/scale selections that conform to each chord selection (at 220).

Focusing on the pattern generator effects first, the dynamic, chord based, MIDI scale and pattern generator effects creation method 200 of some embodiments applies different unique pattern generator effects of individual tone sequences (arpeggios, melodies, basslines, etc.) to specified MIDI note locations (at 225). In some embodiments, the different unique pattern generator effects of individual tone sequences (arpeggios, melodies, basslines, etc.) are reflective of the received audio/MIDI chord input. For example, the MIDI note locations may be specified as the 'black keys' of a MIDI keyboard or some other combination of keys on the MIDI keyboard. In this way, the pattern generator effects of individual tone sequences (arpeggios, melodies, basslines, etc.) will reflect the audio/MIDI chord input and, when applied to the specified MIDI note locations, will be readily available as pattern generator effects of those individual tone sequences (MIDI effects) to a user of the MIDI keyboard, thereby making it easier to play basslines, melodies, and arpeggios that work well with each chord.

After applying the different unique pattern generator effects of individual tone sequences to the specified MIDI note locations (at 225), the dynamic, chord based, MIDI scale and pattern generator effects creation method 200 rounds all tones within each pattern to scale tones or chord tones as defined by the received audio/MIDI chord input and resulting chord, root noted, key, and scale definitions (at 227). This step is followed by the dynamic, chord based, MIDI scale and pattern generator effects creation method 200 transposing patterns with each input chord selection and placing the root note of the chord as the lowest tone in the pattern (at 229).

Several parameters are associated with each of the different, unique pattern generator effects. The parameters can be programmed independently from the pattern generator effects and can include any combination of or variety of parameters. Examples of the parameters associated with each different, unique pattern generator effect include, without limitation, parameters for direction, octaves, gate, number of tones, chord type, rate, inversions, voicings, rhythm, etc. Accordingly, the dynamic, chord based, MIDI scale and pattern generator effects creation method 200 of some embodiments applies pattern generator effects parameters (such as direction, notes, rate, gate, octave, direction, number of tones, chord type, inversions, voicings, rhythm, etc.) to each unique pattern generator effect (at 230), and in a way that is independent of the other different, unique pattern generator effects. Note that the pattern generator effects and functions described above are explained in the context of being triggered by the selection of MIDI note locations, they could also be utilized within the context of a sequencer software program where patterns are generated without MIDI note selections.

Now focusing on placement of individual tones (including chord tones and scale tones based on the chord information from the audio/MIDI chord input), the dynamic, chord based, MIDI scale and pattern generator effects creation method 200 of some embodiments determines (at 235) which smart scale mapping function is selected to apply to specified MIDI note locations. In some embodiments, a smart scale mapping function may be selected by a user, or may be set from a prior use or as a default setting in software. The smart scale mapping functions comprise a "chord tones only" smart scale mapping function, a "chord tones" smart scale mapping function, a "dynamic scale" smart scale mapping function, a "relative scale" smart scale mapping function, and an "absolute scale" smart scale mapping function.

When the smart scale mapping function is determined to be the "chord tones only" smart scale mapping function, the dynamic, chord based, MIDI scale and pattern generator effects creation method 200 of some embodiments performs chord tones only mapping (at 240). The chord tones only mapping (at 240) aligns chord tones to the specified MIDI note locations, which the dynamic, chord based, MIDI scale and pattern generator effects creation method 200 outputs (at 265) to the destination software for placement or music device hardware for positioning. An example of "chord tones only" smart scale mapping is described further below, by reference to FIG. 3. Examples of tone placement as output by the "chord tones only" smart scale mapping are described further below, by reference to FIGS. 4-6.

When the smart scale mapping function is determined to be the "chord tones" smart scale mapping function, the dynamic, chord based, MIDI scale and pattern generator effects creation method 200 of some embodiments performs chord tones mapping (at 245). The chord tones mapping (at 245) aligns scale tones to the specified MIDI note locations, which the dynamic, chord based, MIDI scale and pattern generator effects creation method 200 outputs (at 265) to the destination software for placement or music device hardware for positioning. An example of "chord tones" smart scale mapping is described further below, by reference to FIG. 7. Examples of tone placement as output by the "chord tones" smart scale mapping are described further below, by reference to FIGS. 8-10.

When the smart scale mapping function is determined to be the "dynamic scale" smart scale mapping function, the dynamic, chord based, MIDI scale and pattern generator effects creation method 200 of some embodiments performs dynamic scale mapping (at 250) which aligns scale tones to the specified MIDI note locations and outputs (at 265) the aligned scale tones to the destination software for placement or music device hardware for positioning. An example of "dynamic scale" smart scale mapping is described further below, by reference to FIG. 11. Examples of tone placement as output by the "dynamic scale" smart scale mapping are described further below, by reference to FIGS. 12-14.

When the smart scale mapping function is determined to be the "relative scale" smart scale mapping function, the dynamic, chord based, MIDI scale and pattern generator effects creation method 200 of some embodiments performs relative scale mapping (at 255) which aligns scale tones to the specified MIDI note locations in sequential order and outputs (at 265) the sequentially aligned scale tones to the destination software for sequential placement or music device hardware for sequential positioning. An example of "relative scale" smart scale mapping is described further below, by reference to FIG. 15.

When the smart scale mapping function is determined to be the "absolute scale" smart scale mapping function, the dynamic, chord based, MIDI scale and pattern generator effects creation method 200 of some embodiments performs absolute scale mapping (at 260) which keeps scale tones as close as possible to their natural positions and outputs (at 265) the results to the destination software for sequential placement or music device hardware for sequential positioning. An example of "absolute scale" mapping is described further below, by reference to FIG. 16.

After outputting to the destination software or enabling the mapping within the music device hardware (at 265), the dynamic, chord based, MIDI scale and pattern generator effects creation method 200 of some embodiments ends.

Figure 3:
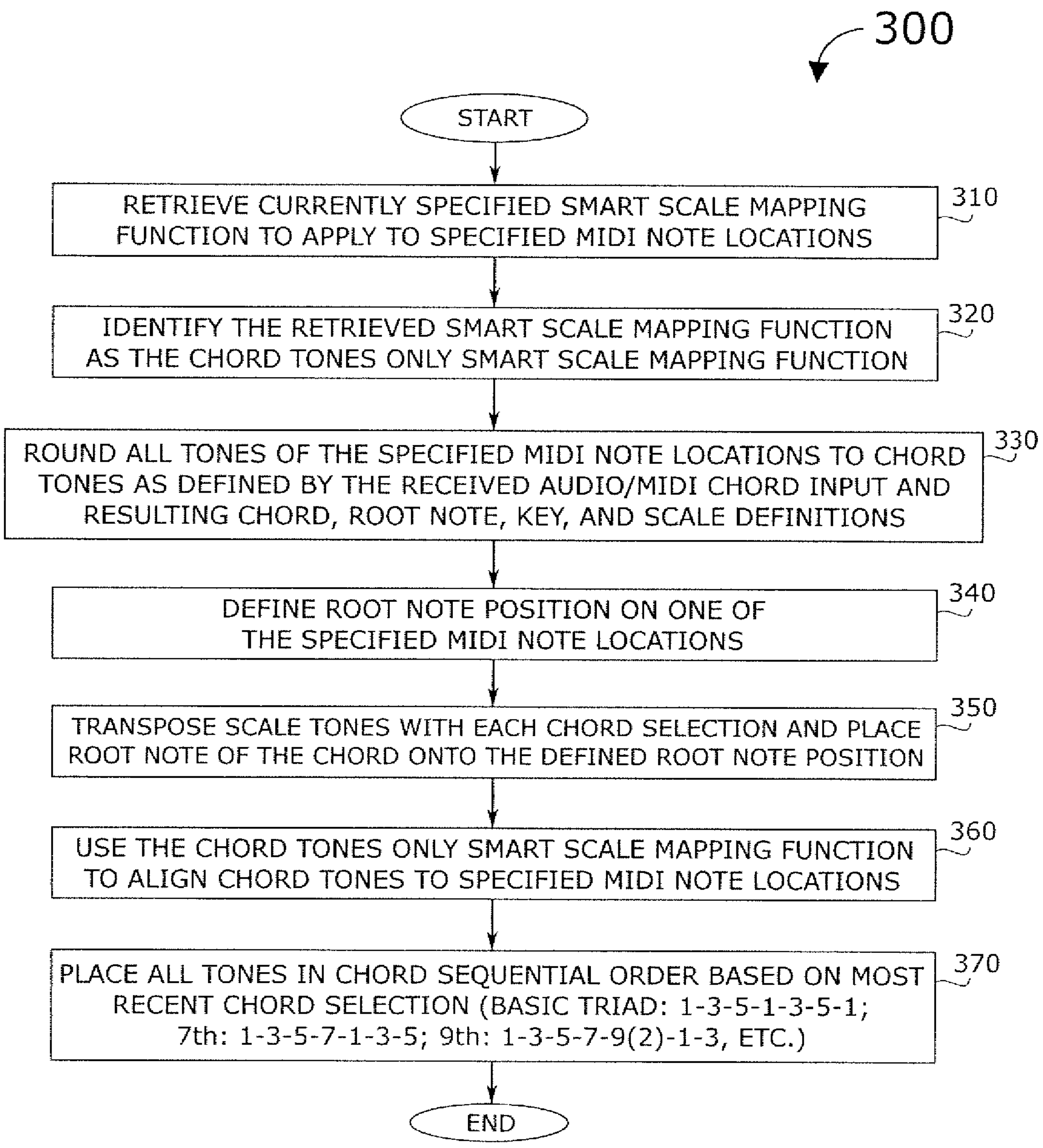
FIG. 3 conceptually illustrates a chord tones only smart scale mapping process in some embodiments.

By way of example, FIG. 3 conceptually illustrates a chord tones only smart scale mapping process 300. In some embodiments, the chord tones only smart scale mapping process 300 is started when the dynamic, chord based, MIDI scale and pattern generator effects creation method 200, described above by reference to FIG. 2, determines (at 235) that the smart scale mapping function which is presently selected to apply to specified MIDI note locations is the "chord tones only" smart scale mapping function.

In some embodiments, the chord tones only smart scale mapping process 300 starts by retrieving (at 310) the currently specified smart scale mapping function to apply to specified MIDI note locations. For example, a software implementation of the method may have a selectable smart scale mapping tool that allows a user to select a particular smart scale mapping function to apply with respect to the specified MIDI note locations. Next, the chord tones only smart scale mapping process 300 identifies (at 320) the retrieved smart scale mapping function as the chord tones only smart scale mapping function.

In some embodiments, the chord tones only smart scale mapping process 300 rounds all tones of the specified MIDI note locations to chord tones (at 330) as defined by the received audio/MIDI chord input and resulting chord, root note, key, and scale definitions. Next, the chord tones only smart scale mapping process 300 defines a root note position (at 340) on one of the specified MIDI note locations. After defining the root note position, the chord tones only smart scale mapping process 300 of some embodiments transposes scale tones with each chord selection and places the root note of the chord onto the defined root note position (at 350).

In some embodiments, the chord tones only smart scale mapping process 300 moves forward to the next step of using the chord tones only smart scale mapping function to align chord tones to specified MIDI note locations (at 360). After alignment is completed, the chord tones only smart scale mapping process 300 of some embodiments places all tones in chord sequential order based on the most recent chord selection (at 370). There can be a variety of chord sequential orders for placement of the tones, such as a basic triad (i.e., 1-3-5-1-3-5-1), a seventh (i.e., 1-3-5-7-1-3-5), a ninth (i.e., 1-3-5-7-9(2)-1-3), etc. Specific examples of tone placement as output by the "chord tones only" smart scale mapping are described further below, by reference to FIGS. 4-6. Then the chord tones only smart scale mapping process 300 ends.

Figure 4:
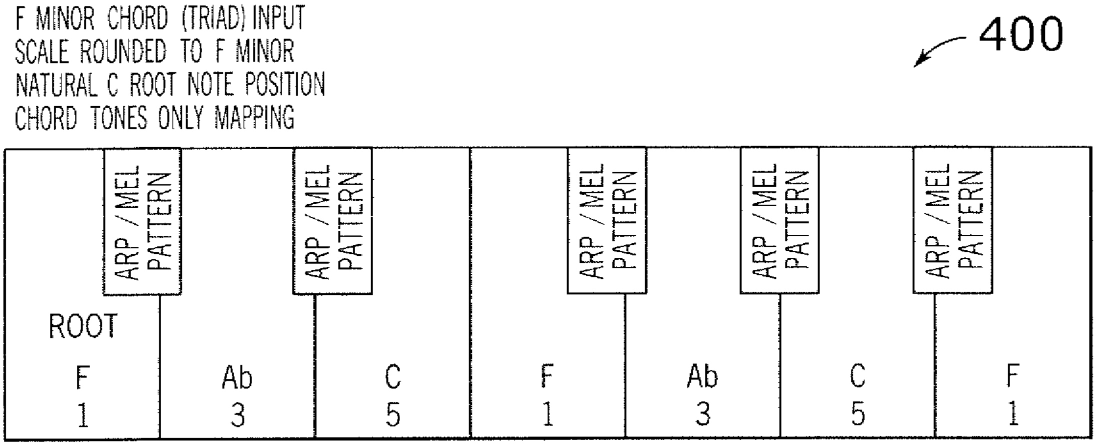
FIG. 4 conceptually illustrates a first example of chord tones only mapping as output by the chord tones only smart scale mapping process.

By way of example, FIG. 4 conceptually illustrates a first example of placement of all tones in chord sequential order 400 as output by the chord tones only smart scale mapping process 300. As shown in this figure, a basic triad order (1-3-5-1-3-5-1) is used for the placement of all tones in chord sequential order 400 based on F minor chord input, scale rounded to F minor, and root chord F minor note placed in the natural C root note position. The result is placement of tones F-A-C-F-A-C-F and pattern generator effects placed on the black piano keys in this example.

Figure 5:
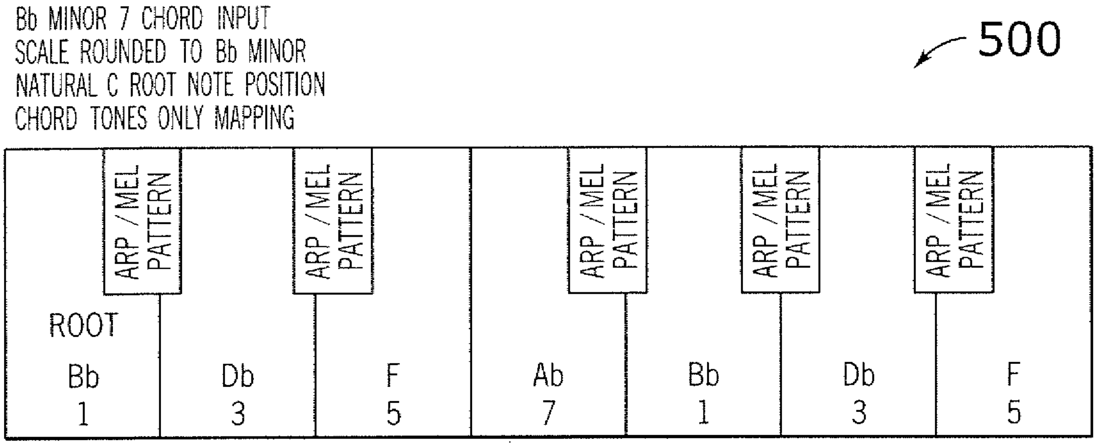
FIG. 5 conceptually illustrates a second example of chord tones only mapping as output by the chord tones only smart scale mapping process.

Turning to another view, FIG. 5 conceptually illustrates a second example of placement of all tones in chord sequential order 500 as output by the chord tones only smart scale mapping process 300. As shown in this figure, a seventh order (1-3-5-7-1-3-5) is used for the placement of all tones in chord sequential order 500 based on B minor seventh chord input, scale rounded to B minor, and root chord B minor note placed in the natural C root note position. The result is placement of tones B-D-F-A-B-D-F and pattern generator effects placed on the black piano keys in this example.

Figure 6:
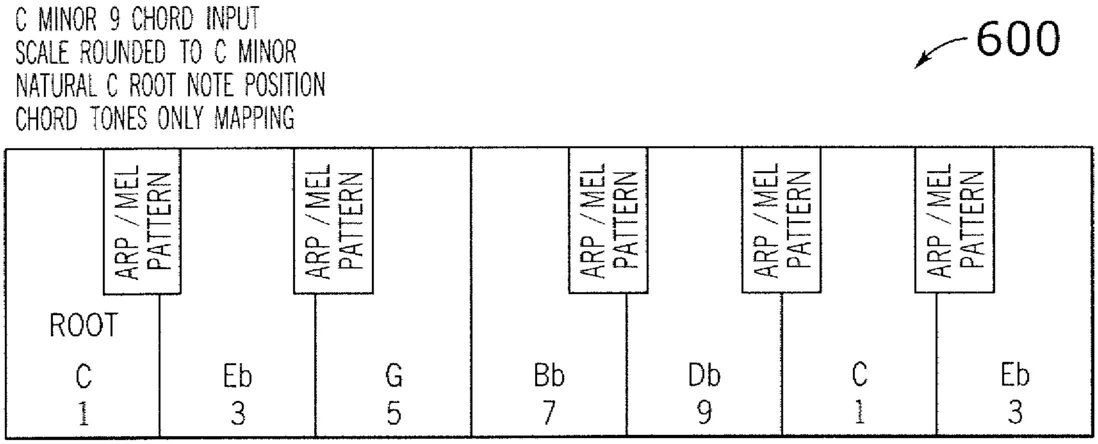
FIG. 6 conceptually illustrates a third example of chord tones only mapping as output by the chord tones only smart scale mapping process.

FIG. 6 conceptually illustrates a third example of placement of all tones in chord sequential order 600 as output by the chord tones only smart scale mapping process 300. As shown in this figure, a ninth order (1-3-5-7-9(2)-1-3) is used for the placement of all tones in chord sequential order 600 based on C minor ninth chord input, scale rounded to C minor, and root chord C minor note placed in the natural C root note position. The result is placement of tones C-E-G-B-D-C-E and pattern generator effects placed on the black keys in this example.

Figure 7:
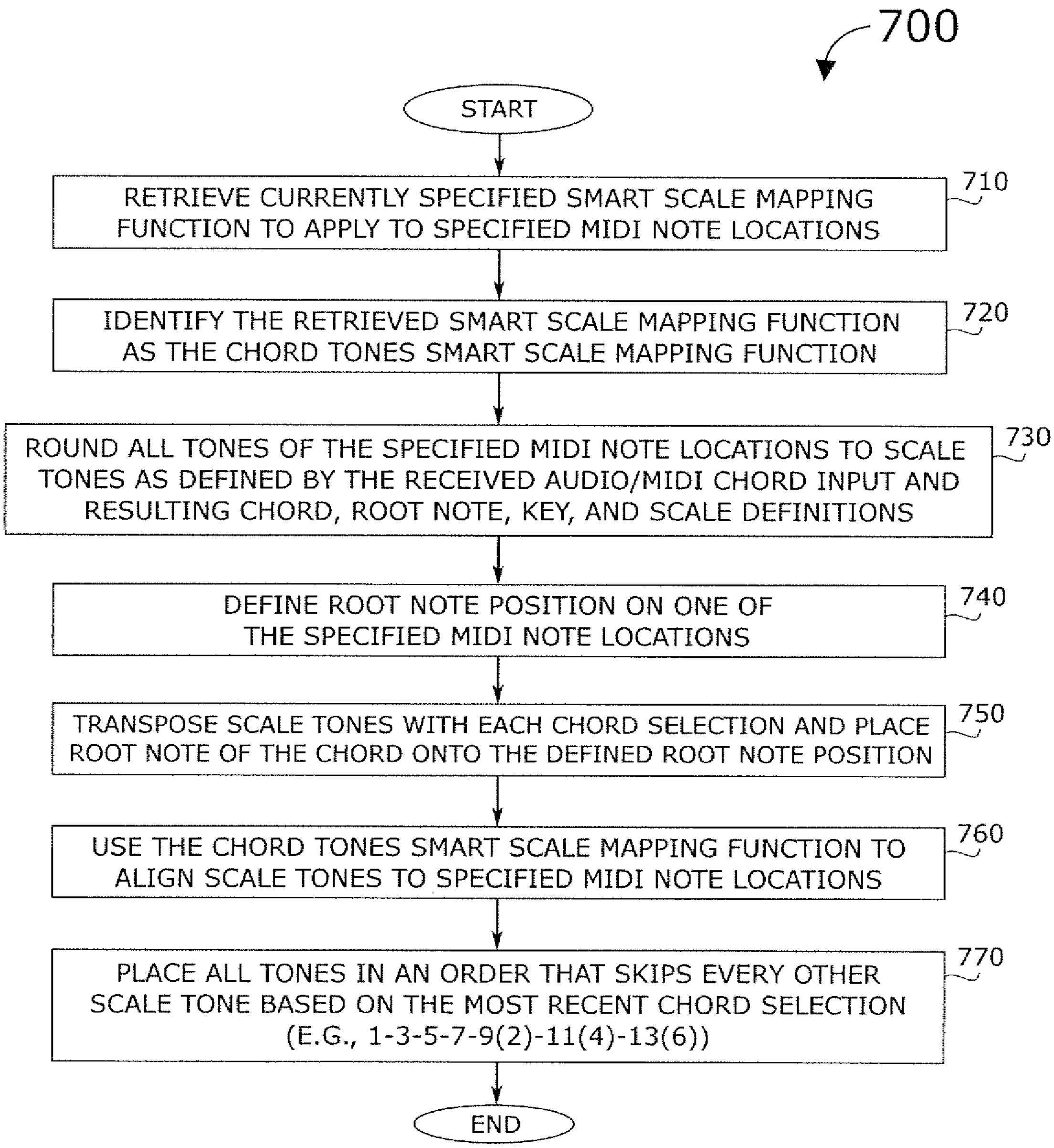
FIG. 7 conceptually illustrates a chord tones smart scale mapping process in some embodiments.

Now turning to another smart scale mapping function example, FIG. 7 conceptually illustrates a chord tones smart scale mapping process 700. In some embodiments, the chord tones smart scale mapping process 700 is started when the dynamic, chord based, MIDI scale and pattern generator effects creation method 200, described above by reference to FIG. 2, determines (at 235) that the smart scale mapping function which is presently selected to apply to specified MIDI note locations is the "chord tones" smart scale mapping function.

In some embodiments, the chord tones smart scale mapping process 700 starts by retrieving (at 710) the currently specified smart scale mapping function to apply to specified MIDI note locations. In this case, the chord tones smart scale mapping process 700 identifies (at 720) the retrieved smart scale mapping function as the chord tones smart scale mapping function.

In some embodiments, the chord tones smart scale mapping process 700 rounds all tones of the specified MIDI note locations to scale tones (at 730) as defined by the received audio/MIDI chord input and resulting chord, root note, key, and scale definitions. Next, the chord tones smart scale mapping process 700 defines the root note position (at 740) on one of the specified MIDI note locations. After defining the root note position, the chord tones smart scale mapping process 700 of some embodiments transposes scale tones with each chord selection and places the root note of the chord onto the defined root note position (at 750).

In some embodiments, the chord tones smart scale mapping process 700 uses the chord tones smart scale mapping function to align scale tones to specified MIDI note locations (at 760). After alignment of scale tones is completed, the chord tones smart scale mapping process 700 proceeds to the next step of placing all tones in an order the skips every other scale tone based on the most recent chord selection (at 770). Some examples of placement of the tones to skip every other scale tone (i.e., 1-3-5-7-9(2)-11(4)-13(6)) as output by the "chord tones" smart scale mapping are described further below, by reference to FIGS. 8-10. After placing all tones, the chord tones smart scale mapping process 700 ends.

Figure 8:
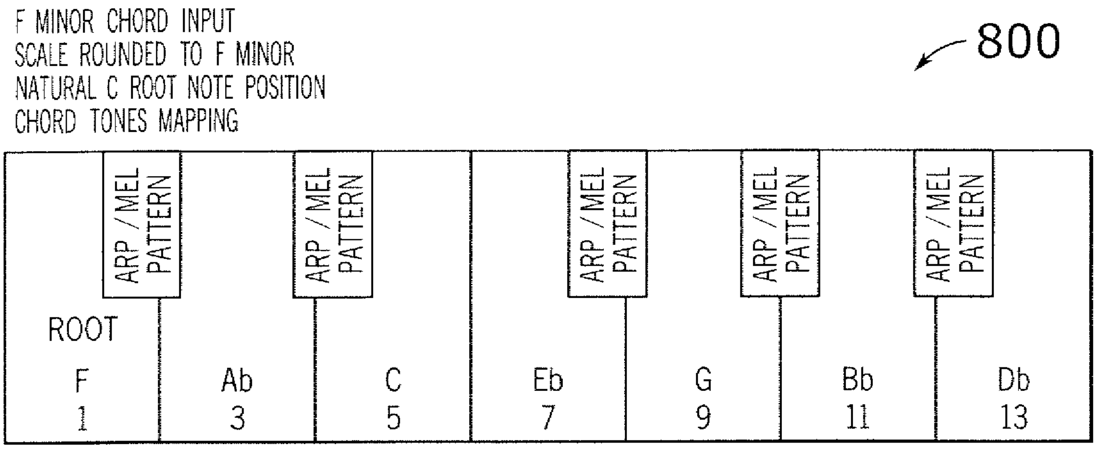
FIG. 8 conceptually illustrates a first example of chord tones mapping as output by the chord tones smart scale mapping process.

Specifically, FIG. 8 conceptually illustrates a first example of placement of the tones to skip every other scale tone 800 as output by the chord tones smart scale mapping process 700. As shown in this figure, the placement of all tones to skip every other scale tone 800 results in a standard skipping order (i.e., 1-3-5-7-9(2)-11(4)-13(6)), starting with F minor chord input, with the scale rounded to F minor, and root chord F minor note placed in the natural C root note position. The result is placement of tones F-A-C-E-G-B-D and pattern generator effects placed on the black piano keys in this example.

Figure 9:
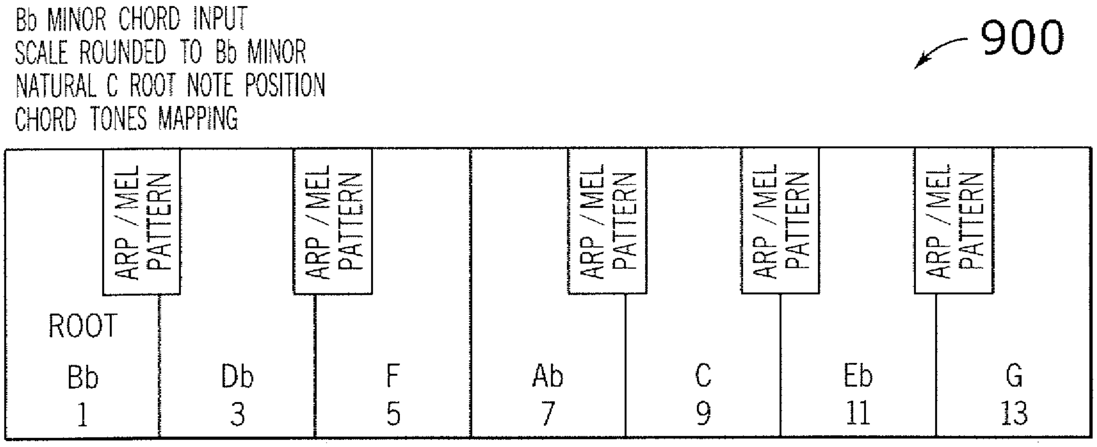
FIG. 9 conceptually illustrates a second example of chord tones mapping as output by the chord tones smart scale mapping process.

In another example, FIG. 9 conceptually illustrates a second example of placement of the tones to skip every other scale tone 900 as output by the chord tones smart scale mapping process 700. As shown in this figure, the placement of all tones to skip every other scale tone 900 results in a standard skipping order (i.e., 1-3-5-7-9(2)-11(4)-13(6)), starting with B minor chord input and scale rounded to B minor. In this example, the B minor chord root note is placed in the natural C root note position. The result is placement of tones B-D-F-A-C-E-G and pattern generator effects placed on the black piano keys in this example.

Figure 10:
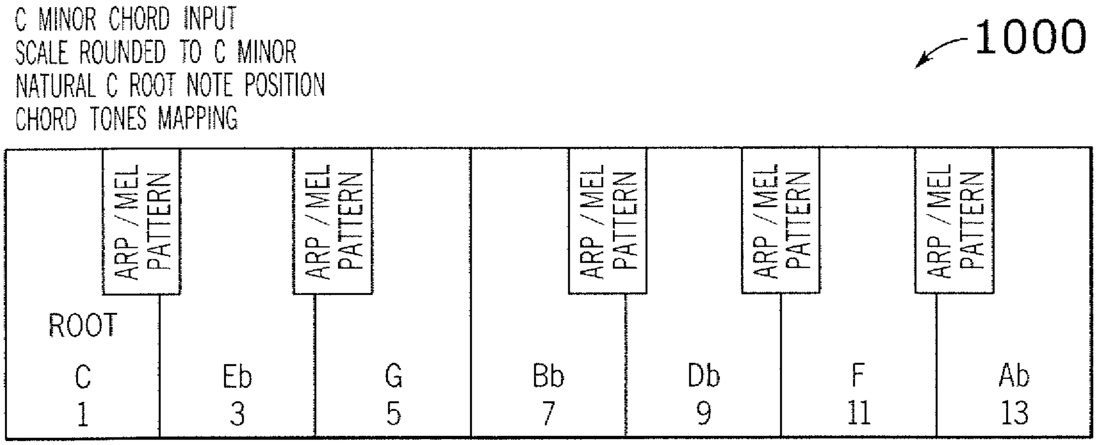
FIG. 10 conceptually illustrates a third example of chord tones mapping as output by the chord tones smart scale mapping process.

Now demonstrating another example tone placement as output of the chord tones smart scale mapping process 700, FIG. 10 conceptually illustrates a third example of placement of the tones to skip every other scale tone 1000. As shown in this figure, the placement of all tones to skip every other scale tone 1000 results in a standard skipping order (i.e., 1-3-5-7-9(2)-11(4)-13(6)), starting with C minor chord input and scale rounded to C minor, and the C minor chord root note being placed in the natural C root note position. The result is placement of tones C-E-G-B-D-F-A and pattern generator effects placed on the black keys.

Figure 11:
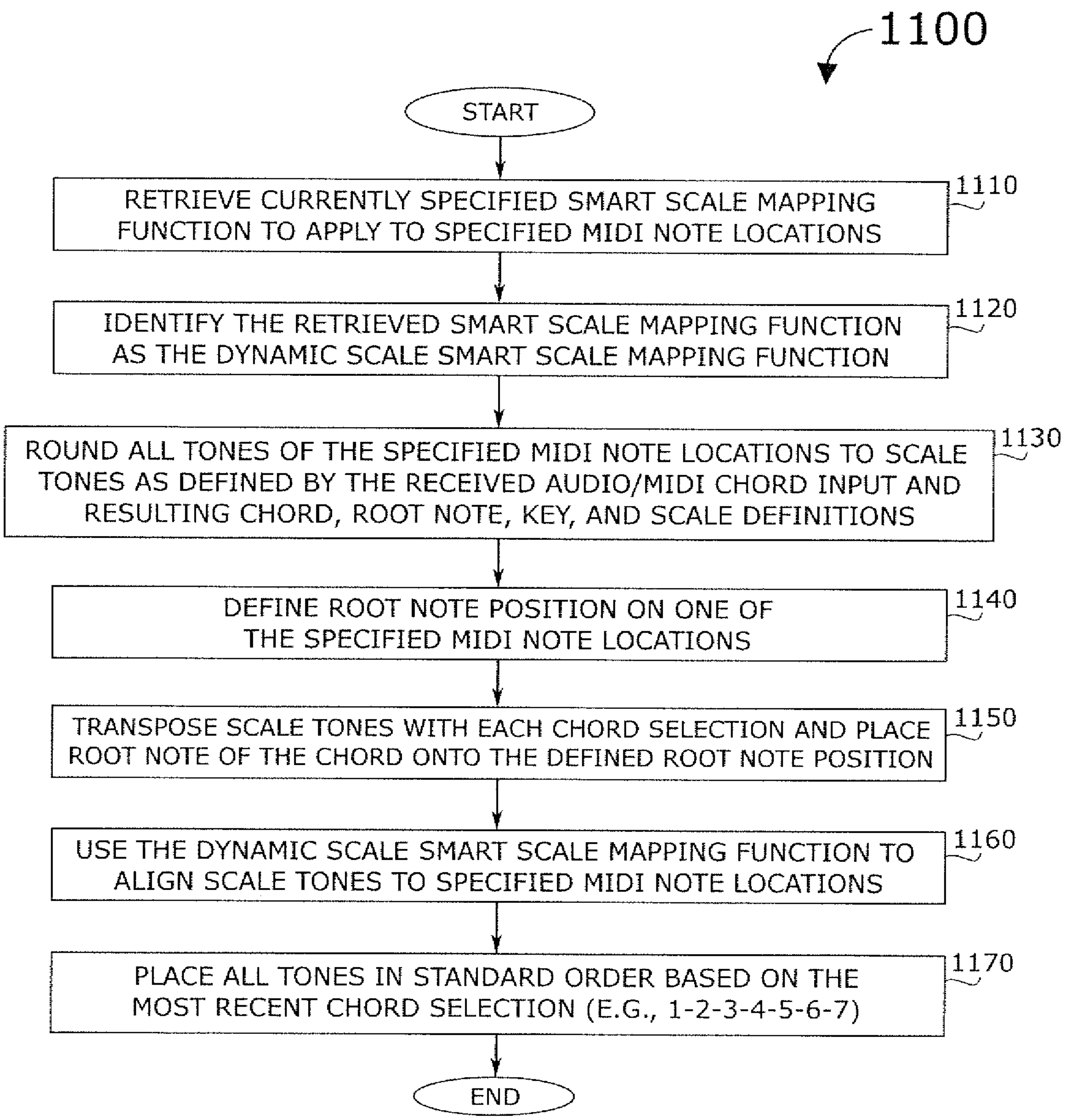
FIG. 11 conceptually illustrates a dynamic scale smart scale mapping process in some embodiments.

Now turning to another smart scale mapping function example, FIG. 11 conceptually illustrates a dynamic scale smart scale mapping process 1100. In some embodiments, the dynamic scale smart scale mapping process 1100 is started when the dynamic, chord based, MIDI scale and pattern generator effects creation method 200, described above by reference to FIG. 2, determines (at 235) that the smart scale mapping function which is presently selected to apply to specified MIDI note locations is the "dynamic scale" smart scale mapping function.

In some embodiments, the dynamic scale smart scale mapping process 1100 starts by retrieving (at 1110) the currently specified smart scale mapping function to apply to specified MIDI note locations. In this case, the dynamic scale smart scale mapping process 1100 identifies (at 1120) the retrieved smart scale mapping function as the dynamic scale smart scale mapping function.

In some embodiments, the dynamic scale smart scale mapping process 1100 rounds all tones of the specified MIDI note locations to scale tones (at 1130) as defined by the received audio/MIDI chord input and resulting chord, root note, key, and scale definitions. Next, the dynamic scale smart scale mapping process 1100 defines the root note position (at 1140) on one of the specified MIDI note locations. After defining the root note position, the dynamic scale smart scale mapping process 1100 of some embodiments transposes scale tones with each chord selection and places the root note of the chord onto the defined root note position (at 1150).

In some embodiments, the dynamic scale smart scale mapping process 1100 uses the dynamic scale smart scale mapping function to align scale tones to specified MIDI note locations (at 1160) which is followed by placing all tones in standard order (i.e., 1-2-3-4-5-6-7) based on the most recent chord selection (at 1170). Some examples of placement of the tones in standard order (i.e., 1-2-3-4-5-6-7) as output by the "dynamic scale" smart scale mapping are described further below, by reference to FIGS. 12-14. After placing all tones, the dynamic scale smart scale mapping process 1100 ends.

Figure 12:
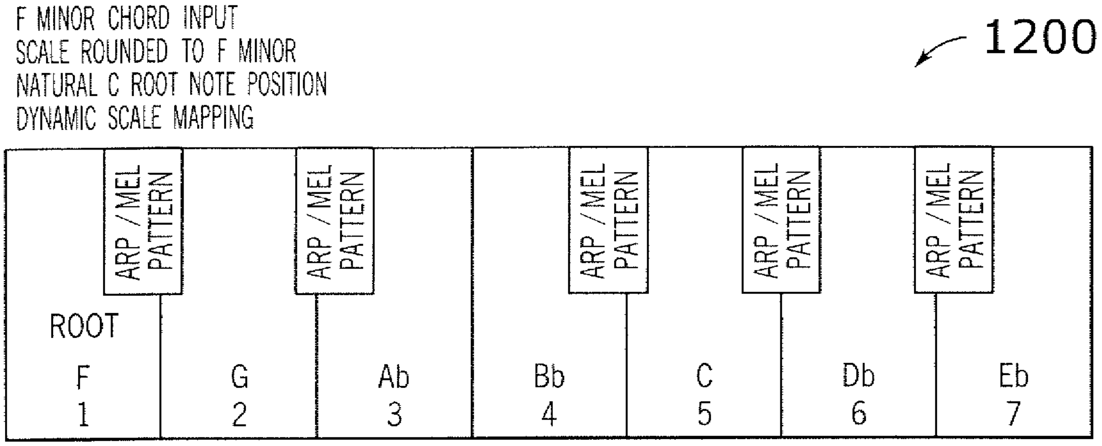
FIG. 12 conceptually illustrates a first example of dynamic scale mapping as output by the dynamic scale smart scale mapping process.

Specifically, FIG. 12 conceptually illustrates a first example of placement of the tones in standard order 1200 as output by the dynamic scale smart scale mapping process 1100. As shown in this figure, the placement of all tones in standard order 1200 results in a standard ordering, 1-2-3-4-5-6-7, starting with F minor chord input, with the scale rounded to F minor, and root chord F minor note placed in the natural C root note position. The result is placement of tones F-G-A-B-C-D-E and pattern generator effects placed on the black piano keys in this example.

Figure 13:
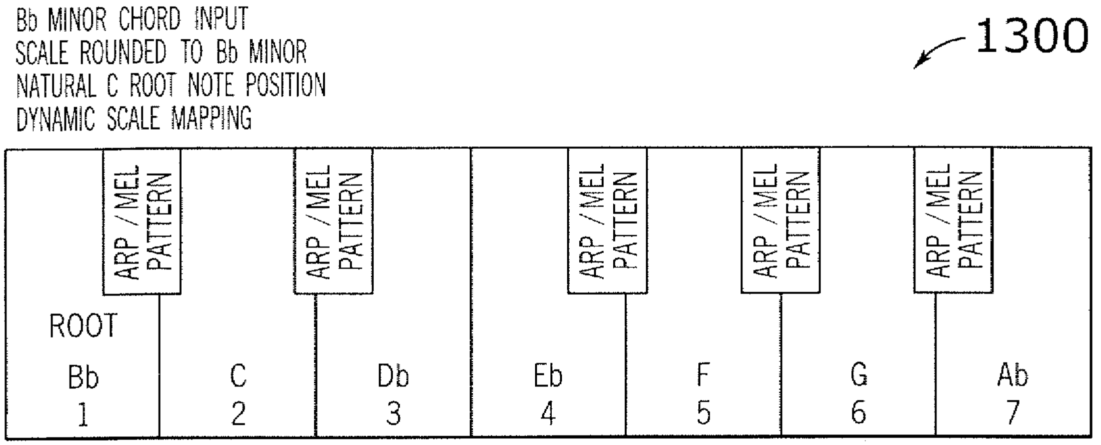
FIG. 13 conceptually illustrates a second example of dynamic scale mapping as output by the dynamic scale smart scale mapping process.

Now, in another demonstration, FIG. 13 conceptually illustrates a second example of placement of the tones in standard order 1300 as output by the dynamic scale smart scale mapping process 1100. As shown in this figure, the placement of all tones in standard order 1300 results in a standard ordering, 1-2-3-4-5-6-7, starting with B minor chord input, with the scale rounded to B minor, and root chord B minor note placed in the natural C root note position. The result is placement of tones B-C-D-E-F-G-A and pattern generator effects placed on the black piano keys in this example.

Figure 14:
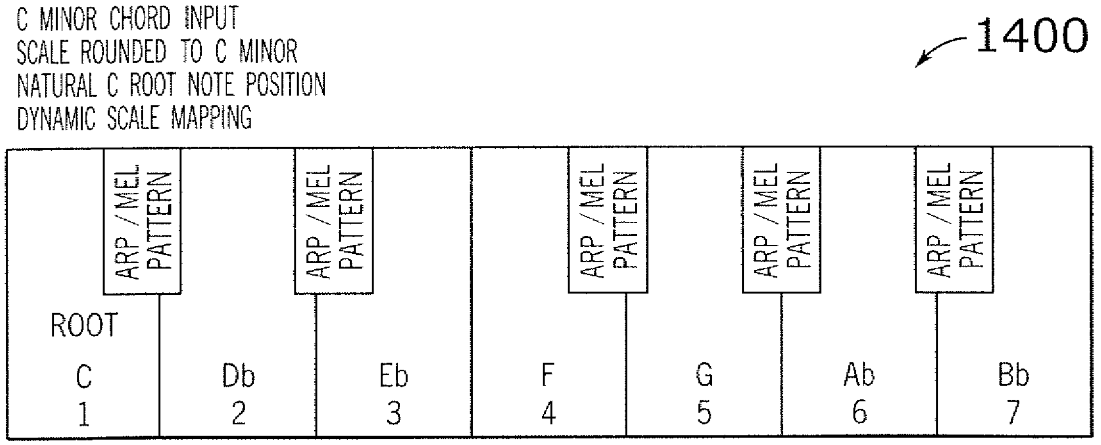
FIG. 14 conceptually illustrates a third example of dynamic scale mapping as output by the dynamic scale smart scale mapping process.

In yet another view, FIG. 14 conceptually illustrates a third example of placement of the tones in standard order 1400 as output by the dynamic scale smart scale mapping process 1100. As shown in this figure, the placement of all tones in standard order 1400 results in a standard ordering, 1-2-3-4-5-6-7, starting with C minor chord input, with the scale rounded to C minor, and root chord C minor note placed in the natural C root note position. The result is placement of tones C-D-E-F-G-A-B and pattern generator effects placed on the black piano keys in this example.

Figure 15:
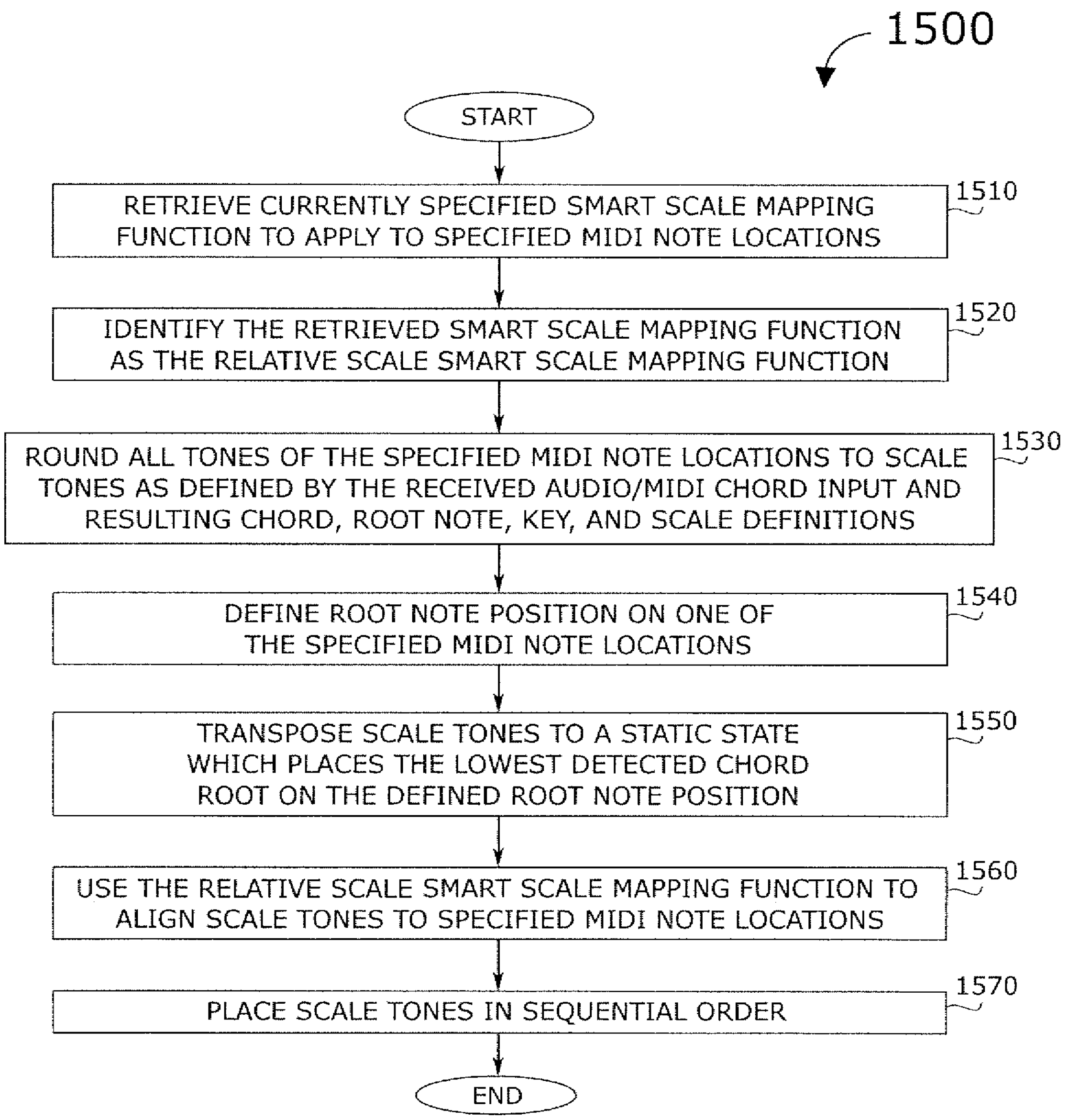
FIG. 15 conceptually illustrates a relative scale smart scale mapping process in some embodiments.

Referring to another smart scale mapping function example, FIG. 15 conceptually illustrates a relative scale smart scale mapping process 1500. In some embodiments, the relative scale smart scale mapping process 1500 is started when the dynamic, chord based, MIDI scale and pattern generator effects creation method 200, described above by reference to FIG. 2, determines (at 235) that the smart scale mapping function which is presently selected to apply to specified MIDI note locations is the "relative scale"

smart scale mapping function. As shown in this figure, the relative scale smart scale mapping process 1500 starts by retrieving (at 1110) the currently specified smart scale mapping function to apply to specified MIDI note locations. In this case, the relative scale smart scale mapping process 1500 identifies (at 1520) the retrieved smart scale mapping function as the relative scale smart scale mapping function.

In some embodiments, the relative scale smart scale mapping process 1500 rounds all tones of the specified MIDI note locations to scale tones (at 1530) as defined by the received audio/MIDI chord input and resulting chord, root note, key, and scale definitions. Next, the relative scale smart scale mapping process 1500 defines the root note position (at 1540) on one of the specified MIDI note locations. After defining the root note position, the relative scale smart scale mapping process 1500 of some embodiments transposes scale tones to a static state which places the lowest detected chord root on the defined root note position (at 1550).

In some embodiments, the relative scale smart scale mapping process 1500 uses the relative scale smart scale mapping function to align scale tones to specified MIDI note locations (at 1560). Then the relative scale smart scale mapping process 1500 places all tones in sequential order (at 1570). Then the relative scale smart scale mapping process 1500 ends.

Figure 16:
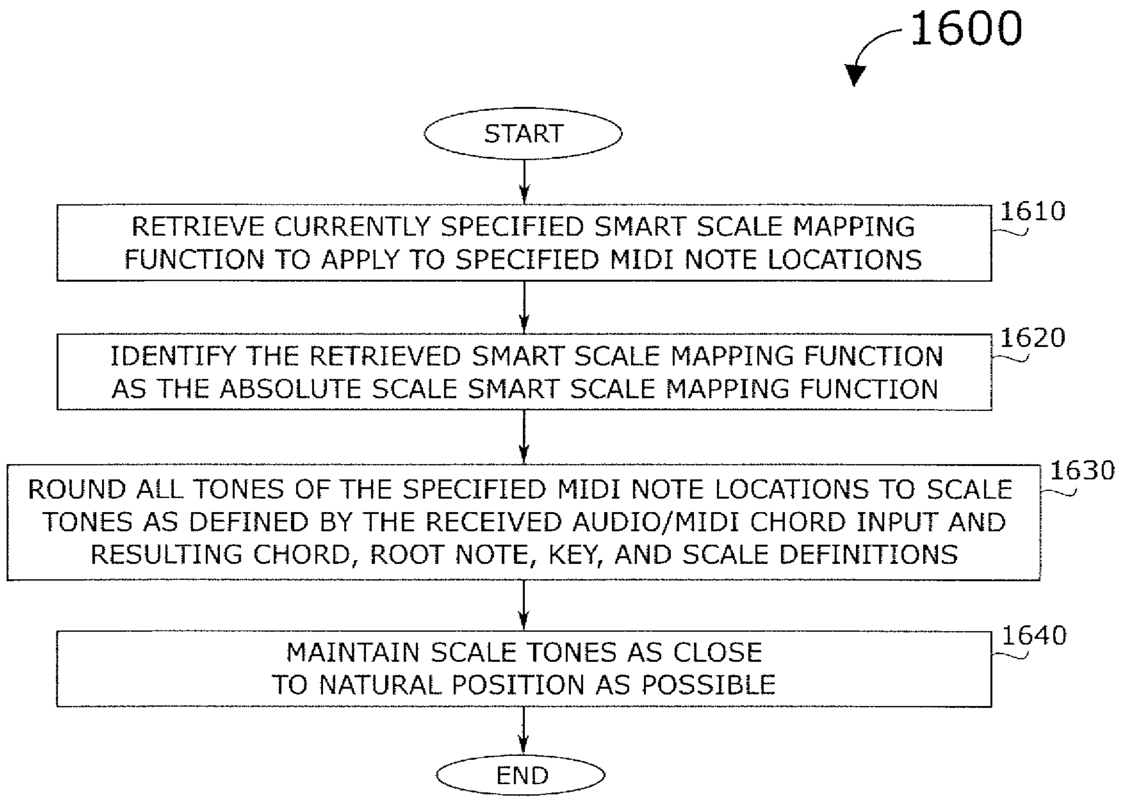
FIG. 16 conceptually illustrates an absolute scale smart scale mapping process in some embodiments.

Finally, turning to another smart scale mapping function example, FIG. 16 conceptually illustrates an absolute scale smart scale mapping process 1600. In some embodiments, the absolute scale smart scale mapping process 1600 is started when the dynamic, chord based, MIDI scale and pattern generator effects creation method 200, described above by reference to FIG. 2, determines (at 235) that the smart scale mapping function which is presently selected to apply to specified MIDI note locations is the "absolute scale" smart scale mapping function. As shown, the absolute scale smart scale mapping process 1600 starts by retrieving (at 1610) the currently specified smart scale mapping function to apply to specified MIDI note locations. In this case, the absolute scale smart scale mapping process 1600 identifies (at 1620) the retrieved smart scale mapping function as the absolute scale smart scale mapping function.

In some embodiments, the absolute scale smart scale mapping process 1600 rounds all tones of the specified MIDI note locations to scale tones (at 1630) as defined by the received audio/MIDI chord input and resulting chord, root note, key, and scale definitions. Then the absolute scale smart scale mapping process 1600 is ready to maintain the scale tones as close to nature position as possible (at 1640). By maintaining the tones as close to the nature position, the absolute scale smart scale mapping process 1600 is finished, and ends.

The above-described embodiments of the dynamic, chord based, MIDI scale and pattern generator effects creation system and the dynamic, chord based, MIDI scale and pattern generator effects creation software-implemented method are presented for purposes of illustration and not of limitation. While focusing on aspects of the dynamic, chord based, MIDI scale and pattern generator effects creation system and method which allows for any audio or MIDI input to influence MIDI effects for creating melodies, basslines and arpeggios that fit over specific chords, and thereby effectively eliminating the need for a specific chord information device, one of ordinary skill in the art will recognize that the dynamic, chord based, MIDI scale and pattern generator effects creation system and software-implemented method can be embodied in other specific forms without departing from the spirit of the invention. Furthermore, numerous specific examples and details have been described for the dynamic, chord based, MIDI scale and pattern generator effects creation system and method. Nevertheless, a person of ordinary skill in the art would recognize that dynamic, chord based, MIDI scale and pattern generator effects creation system and method can be embodied in other specific forms without departing from the spirit of the invention. For instance, the dynamic, chord based, MIDI scale and pattern generator effects creation method can be implemented as software and the dynamic, chord based, MIDI scale and pattern generator effects creation system can be deployed as a cloud-computing architecture with cloud server hardware processing devices and cloud database repositories, and which provides a cloud application service that is hosted on a web server or another cloud server accessible to client computing device connecting over the Internet. However, it is also noted that embodiments of the dynamic, chord based, MIDI scale and pattern generator effects creation system and method can be implemented as other software applications or programs that are either user-interactive software applications, embedded software that runs on audio hardware devices, such as MIDI controllers, MIDI keyboards, synthesizers, etc., or modular software programs that can be plugged in or intergrated with other existing software applications, such as digital audio workstation (DAW) software or other audio processing software.

Many of the above-described features and applications are implemented as software (including the dynamic, chord based, MIDI scale and pattern generator effects creation software method) in which the software performs runtime software processes that are specified as a set of instructions recorded on a computer readable storage medium (also referred to as computer readable medium or machine readable medium). When these instructions are executed by a processor, they cause the processor to perform the actions indicated in the instructions. Examples of computer readable media include, but are not limited to, CD-ROMs, flash drives, RAM chips, hard drives, solid state devices (SSDs), EPROMs, etc. The computer readable media does not include carrier waves and electronic signals passing wirelessly or over wired connections.

Figure 17:
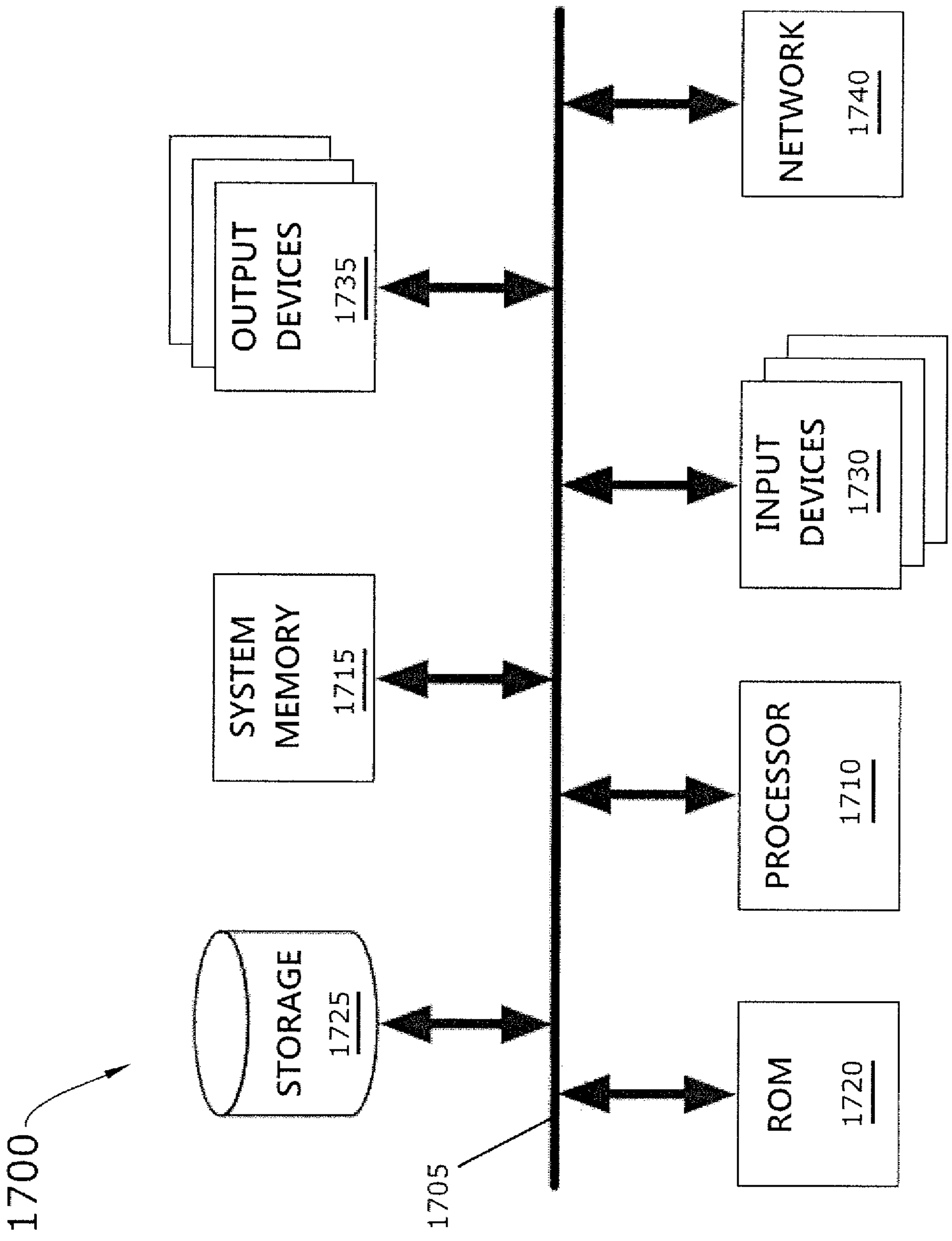
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computing device, such as a desktop computer (with or without digital audio workstation software installed), a laptop computer, or another computing device, such as mobile computing device (e.g., a tablet computing device, a smart phone, etc.), or any other sort of computing or electronic device. Such an electronic system includes various types of computer readable media and interfaces for various other types of computer readable media. Electronic system 1700 includes a bus 1705, processing unit(s) 1710, a system memory 1715, a read-only memory 1720, a permanent storage device 1725, input devices 1730, output devices 1735, and a network 1740.

The bus 1705 collectively represents all system, peripheral, and chipset buses that communicatively connect the numerous internal devices of the electronic system 1700. For instance, the bus 1705 communicatively connects the processing unit(s) 1710 with the read-only 1720, the system memory 1715, and the permanent storage device 1725.

From these various memory units, the processing unit(s) 1710 retrieves instructions to execute and data to process in order to execute the processes of the invention. The processing unit(s) may be a single processor or a multi-core processor in different embodiments.

The read-only-memory (ROM) 1720 stores static data and instructions that are needed by the processing unit(s) 1710 and other modules of the electronic system 1700. The permanent storage device 1725, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1725.

Other embodiments use a removable storage device (such as a flash drive or an optical disc drive) as the permanent storage device 1725. Like the permanent storage device 1725, the system memory 1715 is a read-and-write memory device. However, unlike storage device 1725, the system memory 1715 is a volatile read-and-write memory, such as a random access memory. The system memory 1715 stores some of the instructions and data that the processor needs at runtime. In some embodiments, the invention's processes are stored in the system memory 1715, the permanent storage device 1725, and/or the read-only memory 1720. For example, the various memory units include instructions handling incoming chord input information from any chord information source and remapping standard MIDI through various MIDI effects in accordance with embodiments of the invention describe above. From these various memory units, the processing unit(s) 1710 retrieves instructions to execute and data to process in order to execute the processes of some embodiments.

The bus 1705 also connects to the input and output devices 1730 and 1735. The input devices enable the user to communicate information and select commands to the electronic system. The input devices 1730 include alphanumeric keyboards, pointing devices, chord audio/MIDI sources, audio/MIDI interfaces, MIDI controllers, etc. The output devices 1735 are audio devices configured to play sound or visual devices configured to display images, user interfaces, videos, and/or other computer graphics imagery generated or provided by the electronic system 1700. The output devices 1735 include MIDI controllers, audio/MIDI interfaces, MIDI keyboards, synthesizers, or other MIDI controller devices, as well as standard printers, 3D printers, and all compatible display devices, such as commonly used liquid crystal displays (LCD) and organic light emitting diode (OLED) displays. Some embodiments include devices such as a touchscreen displays that function as both input and output devices.

Finally, as shown in FIG. 17, bus 1705 also couples electronic system 1700 to a network 1740 through a network adapter (not shown). In this manner, the computer can be a part of a network of computers (such as a local area network ("LAN"), a wide area network ("WAN"), or an intranet), or a network of networks (such as the Internet). Any or all components of electronic system 1700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices, audio hardware devices, and/or audio hardware control devices. The processes may be performed by one or more programmable processors and by one or more set of programmable logic circuitry. General and special purpose computing and storage devices can be interconnected through communication networks.

While the invention has been described with reference to numerous specific details, one of ordinary skill in the art will recognize that the invention can be embodied in other specific forms without departing from the spirit of the invention. For instance, FIGS. 2, 3, 7, 11, 15, and 16 conceptually illustrate methods or processes in which the specific operations of each method or process may not be performed in the exact order shown and described. Specific operations may not be performed in one continuous series of operations, and different specific operations may be performed in different embodiments. Furthermore, each method or process could be implemented using several sub-processes, or as part of a larger macro process. Thus, one of ordinary skill in the art would understand that the invention is not to be limited by the foregoing illustrative details, but rather is to be defined by the appended claims.

I claim:

1. A dynamic, chord based, MIDI scale and pattern generator effects creation method comprising:

receiving, at a digital audio workstation ("DAW") with a MIDI sequencer, audio and MIDI chord input from chord information sources configured to provide the audio and MIDI chord input to the DAW;

analyzing, by the DAW, the audio and MIDI chord input to identify incoming chords;

defining chord selections, by the DAW, based on the identified incoming chords;

analyzing, by the DAW, tones of the defined chord selections;

defining, by the DAW in connection with the chord information sources, root tones of the chords based on the analyzed tones of the chord selections;

defining, by the DAW for each defined chord selection, (i) a key selection based on the root tone defined for the defined chord selection and (ii) a scale based on other tones analyzed for the defined chord selection;

specifying MIDI tone locations on the MIDI sequencer of the DAW;

applying, by the DAW, different unique pattern generator effects to the specified MIDI tone locations on the MIDI sequencer of the DAW;

applying, by the DAW, pattern generator effects parameters to each unique pattern generator effect;

identifying, by the DAW, a particular smart scale mapping function that is selected from a plurality of smart scale mapping functions to apply to the specified MIDI tone locations on the MIDI sequencer of the DAW;

performing, by the DAW, the particular smart scale mapping function to remap chord and scale tones to the specified MIDI tone locations on the MIDI sequencer of the DAW; and placing the remapped chord and scale tones to the specified MIDI tone locations for usage in the DAW.

2. The dynamic, chord based, MIDI scale and pattern generator effects creation method of claim 1, wherein the different unique pattern generator effects are applied to the specified MIDI tone locations on the MIDI sequencer of the DAW with the root tone of each incoming chord acting as a lowest tone of each pattern generator effect and other tones of the pattern generator effect being based off of the scale as defined by the incoming chord.

3. The dynamic, chord based, MIDI scale and pattern generator effects creation method of claim 1, wherein the pattern generator effects parameters comprise direction, octaves, gate, number of tones, chord type, rate, inversions, voicings, and rhythm.

4. The dynamic, chord based, MIDI scale and pattern generator effects creation method of claim 1, wherein the plurality of smart scale mapping functions comprise a chord tones only smart scale mapping function, a chord tones smart scale mapping function, a dynamic scale smart scale mapping function, a relative scale smart scale mapping function, and an absolute scale smart scale mapping function.

5. The dynamic, chord based, MIDI scale and pattern generator effects creation method of claim 4, wherein the particular smart scale mapping function is identified as the chord tones only smart scale mapping function, wherein the dynamic, chord based, MIDI scale and pattern generator effects creation method further comprises:

retrieving the chord tones only smart scale mapping function to apply to specified MIDI tone locations on the MIDI sequencer of the DAW;

rounding all tones of the specified MIDI tone locations to chord tones as defined by the received audio and MIDI chord input and resulting chord, root note, key, and scale definitions;

defining a root tone position on one of the specified MIDI tone locations;

transposing chord tones with each chord selection and placing the root tone of the chord onto the defined root tone position;

aligning the chord tones to specified MIDI tone locations on the MIDI sequencer of the DAW; and placing all tones in chord sequential order on the MIDI sequencer of the DAW based on the most recent chord selection.

6. The dynamic, chord based, MIDI scale and pattern generator effects creation method of claim 5, wherein the chord sequential order for placement of the tones comprises one of a basic triad order, a seventh order, and a ninth order.

7. The dynamic, chord based, MIDI scale and pattern generator effects creation method of claim 4, wherein the particular smart scale mapping function is identified as the chord tones smart scale mapping function, wherein the dynamic, chord based, MIDI scale and pattern generator effects creation method further comprises:

retrieving the chord tones smart scale mapping function to apply to specified MIDI tone locations on the MIDI sequencer of the DAW;

rounding all tones of the specified MIDI tone locations to scale tones as defined by the received audio and MIDI chord input and resulting chord, root tone, key, and scale definitions;

defining a root tone position on one of the specified MIDI tone locations;

transposing scale tones with each chord selection and placing the root tone of the chord onto the defined root tone position;

aligning the scale tones to specified MIDI tone locations on the MIDI sequencer of the DAW; and placing, on the MIDI sequencer of the DAW, all tones in an order that skips every other scale tone based on the most recent chord selection.

8. The dynamic, chord based, MIDI scale and pattern generator effects creation method of claim 4, wherein the particular smart scale mapping function is identified as the dynamic scale smart scale mapping function, wherein the dynamic, chord based, MIDI scale and pattern generator effects creation method further comprises:

retrieving the dynamic scale smart scale mapping function to apply to specified MIDI tone locations on the MIDI sequencer of the DAW;

rounding all tones of the specified MIDI tone locations to scale tones as defined by the received audio and MIDI chord input and resulting chord, root tone, key, and scale definitions;

defining a root tone position on one of the specified MIDI tone locations;

transposing scale tones with each chord selection and placing the root tone of the chord onto the defined root tone position;

aligning the scale tones to specified MIDI tone locations on the MIDI sequencer of the DAW; and placing, on the MIDI sequencer of the DAW, all tones in standard order based on the most recent chord selection.

9. The dynamic, chord based, MIDI scale and pattern generator effects creation method of claim 4, wherein the particular smart scale mapping function is identified as the relative scale smart scale mapping function, wherein the dynamic, chord based, MIDI scale and pattern generator effects creation method further comprises:

retrieving the relative scale smart scale mapping function to apply to specified MIDI tone locations on the MIDI sequencer of the DAW;

rounding all tones of the specified MIDI tone locations to scale tones as defined by the received audio and MIDI chord input and resulting chord, root tone, key, and scale definitions;

defining a root tone position on one of the specified MIDI tone locations;

transposing scale tones to a static state which places a lowest detected chord root on the defined root tone position;

aligning the scale tones to specified MIDI tone locations on the MIDI sequencer of the DAW; and placing, on the MIDI sequencer of the DAW, all tones in sequential order.

10. The dynamic, chord based, MIDI scale and pattern generator effects creation method of claim 4, wherein the particular smart scale mapping function is identified as the absolute scale smart scale mapping function, wherein the dynamic, chord based, MIDI scale and pattern generator effects creation method further comprises:

retrieving the relative scale smart scale mapping function to apply to specified MIDI tone locations on the MIDI sequencer of the DAW;

rounding all tones of the specified MIDI tone locations to scale tones as defined by the received audio and MIDI chord input and resulting chord, root tone, key, and scale definitions; and maintaining scale tones on the MIDI sequencer of the DAW in an order as close to a natural positioning as possible.

11. A dynamic, chord based, MIDI scale and pattern generator effects creation method comprising:

receiving, at a MIDI controller, audio and MIDI chord input from chord information sources configured to provide the audio and MIDI chord input to the MIDI controller;

analyzing, by the MIDI controller, the audio and MIDI chord input to identify incoming chords;

defining chord selections, by the MIDI controller, based on the identified incoming chords;

analyzing, by the MIDI controller, tones of the defined chord selections;

defining, by the MIDI controller in connection with the chord information sources, root tones of the chords based on the analyzed tones of the chord selections;

defining, by the MIDI controller for each defined chord selection, (i) a key selection based on the root tone defined for the defined chord selection and (ii) a scale based on other tones analyzed for the defined chord selection;

specifying MIDI tone locations on tone triggering interface components of the MIDI controller;

applying, by the MIDI controller, different unique pattern generator effects to the specified MIDI tone locations on the tone triggering interface components of the MIDI controller;

applying, by the MIDI controller, pattern generator effects parameters to each unique pattern generator effect;

identifying, by the MIDI controller, a particular smart scale mapping function that is selected from a plurality of smart scale mapping functions to apply to the specified MIDI tone locations on the tone triggering interface components of the MIDI controller;

performing, by the MIDI controller, the particular smart scale mapping function to remap chord and scale tones to the specified MIDI tone locations on the tone triggering interface components of the MIDI controller; and placing the remapped chord and scale tones, by the MIDI controller, to the specified MIDI tone locations on the tone triggering interface components of the MIDI controller.

12. The dynamic, chord based, MIDI scale and pattern generator effects creation method of claim 11, wherein the different unique pattern generator effects are applied to the specified MIDI tone locations on the tone triggering interface components of the MIDI controller with the root tone of each incoming chord acting as a lowest tone of each pattern generator effect and other tones of the pattern generator effect being based off of the scale as defined by the incoming chord.

13. The dynamic, chord based, MIDI scale and pattern generator effects creation method of claim 11, wherein the pattern generator effects parameters comprise direction, octaves, gate, number of tones, chord type, rate, inversions, voicings, and rhythm.

14. The dynamic, chord based, MIDI scale and pattern generator effects creation method of claim 11, wherein the plurality of smart scale mapping functions comprise a chord tones only smart scale mapping function, a chord tones smart scale mapping function, a dynamic scale smart scale mapping function, a relative scale smart scale mapping function, and an absolute scale smart scale mapping function.

15. The dynamic, chord based, MIDI scale and pattern generator effects creation method of claim 14, wherein the particular smart scale mapping function is identified as the chord tones only smart scale mapping function, wherein the dynamic, chord based, MIDI scale and pattern generator effects creation method further comprises:

retrieving the chord tones only smart scale mapping function to apply to specified MIDI tone locations on the tone triggering interface components of the MIDI controller;

rounding all tones of the specified MIDI tone locations to chord tones as defined by the received audio and MIDI chord input and resulting chord, root note, key, and scale definitions;

defining a root tone position on one of the specified MIDI tone locations;

transposing chord tones with each chord selection and placing the root tone of the chord onto the defined root tone position;

aligning the chord tones to specified MIDI tone locations on the tone triggering interface components of the MIDI controller; and placing all tones in chord sequential order on the tone triggering interface components of the MIDI controller based on the most recent chord selection.

16. The dynamic, chord based, MIDI scale and pattern generator effects creation method of claim 15, wherein the chord sequential order for placement of the tones comprises one of a basic triad order, a seventh order, and a ninth order.

17. The dynamic, chord based, MIDI scale and pattern generator effects creation method of claim 14, wherein the particular smart scale mapping function is identified as the chord tones smart scale mapping function, wherein the dynamic, chord based, MIDI scale and pattern generator effects creation method further comprises:

retrieving the chord tones smart scale mapping function to apply to specified MIDI tone locations on the tone triggering interface components of the MIDI controller;

rounding all tones of the specified MIDI tone locations to scale tones as defined by the received audio and MIDI chord input and resulting chord, root tone, key, and scale definitions;

defining a root tone position on one of the specified MIDI tone locations;

transposing scale tones with each chord selection and placing the root note-tone of the chord onto the defined root tone position;

aligning the scale tones to specified MIDI tone locations on the tone triggering interface components of the MIDI controller; and placing, on the tone triggering interface components of the MIDI controller, all tones in an order that skips every other scale tone based on the most recent chord selection.

18. The dynamic, chord based, MIDI scale and pattern generator effects creation method of claim 14, wherein the particular smart scale mapping function is identified as the dynamic scale smart scale mapping function, wherein the dynamic, chord based, MIDI scale and pattern generator effects creation method further comprises:

retrieving the dynamic scale smart scale mapping function to apply to specified MIDI tone locations on the tone triggering interface components of the MIDI controller;

rounding all tones of the specified MIDI tone locations to scale tones as defined by the received audio and MIDI chord input and resulting chord, root tone, key, and scale definitions;

defining a root tone position on one of the specified MIDI tone locations;

transposing scale tones with each chord selection and placing the root tone of the chord onto the defined root tone position;

aligning the scale tones to specified MIDI tone locations on the tone triggering interface components of the MIDI controller; and placing, on the tone triggering interface components of the MIDI controller, all tones in standard order based on the most recent chord selection.

19. The dynamic, chord based, MIDI scale and pattern generator effects creation method of claim 14, wherein the particular smart scale mapping function is identified as the relative scale smart scale mapping function, wherein the dynamic, chord based, MIDI scale and pattern generator effects creation method further comprises:

retrieving the relative scale smart scale mapping function to apply to specified MIDI tone locations on the tone triggering interface components of the MIDI controller;

rounding all tones of the specified MIDI tone locations to scale tones as defined by the received audio and MIDI chord input and resulting chord, root tone, key, and scale definitions;

defining a root tone position on one of the specified MIDI tone locations;

transposing scale tones to a static state which places a lowest detected chord root on the defined root tone position;

aligning the scale tones to specified MIDI tone locations on the tone triggering interface components of the MIDI controller; and placing, on the tone triggering interface components of the MIDI controller, all tones in sequential order.

20. The dynamic, chord based, MIDI scale and pattern generator effects creation method of claim 14, wherein the particular smart scale mapping function is identified as the absolute scale smart scale mapping function, wherein the dynamic, chord based, MIDI scale and pattern generator effects creation method further comprises:

retrieving the relative scale smart scale mapping function to apply to specified MIDI tone locations on the tone triggering interface components of the MIDI controller;

rounding all tones of the specified MIDI tone locations to scale tones as defined by the received audio and MIDI chord input and resulting chord, root tone, key, and scale definitions; and maintaining scale tones on the tone triggering interface components of the MIDI controller in an order as close to a natural positioning as possible.

* * * * *